Dec. 16, 1952

A. J. VOLZ ET AL 2,621,910

CHARGE FORMING DEVICE

Filed Sept. 13, 1946

INVENTORS
ARTHUR J. VOLZ
BY ELMER A. HAASE

ATTORNEY

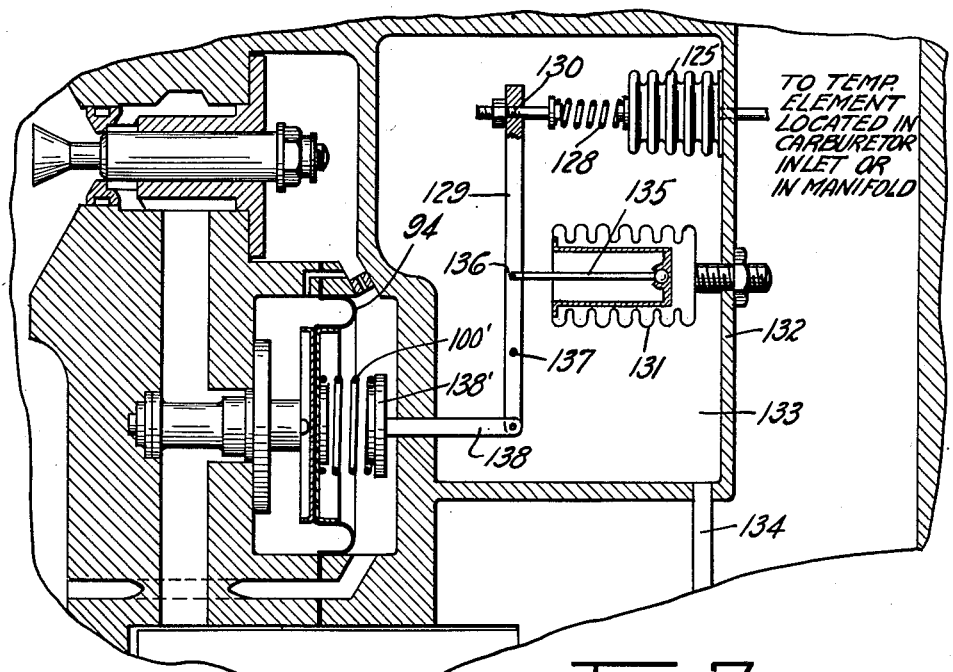
Fig. 7
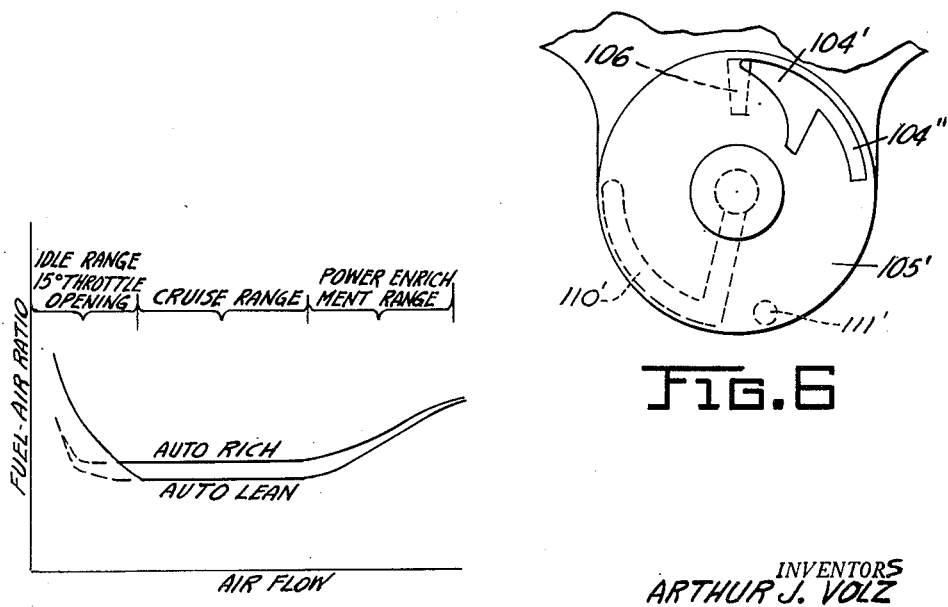
Fig. 6
Fig. 5
INVENTORS
ARTHUR J. VOLZ
ELMER A. HAASE
ATTORNEY Patented Dec. 16, 1952

2,621,910

UNITED STATES PATENT OFFICE 2,621,910

CHARGE FORMING DEVICE

Arthur J. Volz and Elmer A. Haase, South Bend, Ind., assignors to Bendix Aviation Corporation, South Bend, Ind., a corporation of Delaware Application September 13, 1946, Serial No. 696,690

10 Claims. (Cl. 261—39)

This invention relates to charge forming devices or carburetors for internal combustion engines, and while not restricted thereto, it is particularly concerned with improvements in carburetors of the injection or pressure feed type such as disclosed in the copending application of Frank C. Mock, Serial No. 362,572, filed October 24, 1940, now Patent No. 2,447,261, and commonly known as the "Stromberg Injection Carburetor."

In carburetors of this type, the metering pressure across the jets and hence the rate of fuel flow is regulated in relation to power requirements by impressing an air metering force on an air diaphragm which is balanced for a given air flow by an opposed fuel metering force impressed on a fuel diaphragm, the resultant differential of these forces controlling the opening and closing movements of a fuel valve which admits fuel to the metering jets. The fuel metering force is controlled by the air metering force which in turn is controlled by and is proportional to the venturi-to-air-scoop differential in the Venturi system of the carburetor. In a carburetor having a venturi, the pressure drop across the latter is proportional to the velocity squared times air density, and when the throttle is moved toward closed or partly-closed position, the velocity of the air flowing through the venturi is reduced, which correspondingly reduces the air metering force and the fuel metering differential pressure or metering head; and likewise, as the density decreases with a gain in altitude, the velocity increases, which would result in a corresponding increase in the air metering force in the absence of a suitable density-responsive control element. This complicates the problem of accurate metering at extremely low or idling air flows without affecting the accuracy of metering in the normal power ranges. To avoid "leaning out" to a point of engine failure, an idle spring has been utilized heretofore which acts on the fuel valve to hold the latter open sufficiently to give a slight enrichment at extremely low air flows, both full and part throttle, and to enable a richer mixture at idling speeds. The idle spring adds a certain auxiliary force to the air metering force, which auxiliary force is at a maximum at minimum air flows and tends to diminish as the air flow increases and the valve moves in a direction away from the spring.

The organization and construction of the fuel valve and diaphragm assembly and coacting idle spring which go to make up the regulator as heretofore used in Stromberg injection carburetors has proved effective under all conditions of service over a period of years, but the more exacting requirements of modern aircraft engine manufacturers has given rise to problems which have become increasingly difficult to solve. Thus, the metering head was of necessity so low at idling and at part throttle bordering on idling as to produce inconsistent metering, due to the instability of the idle spring which must of necessity be relatively weak while the main fuel valve and component parts which it then controls must be relatively heavy, and this also sometimes resulted in a change in fuel flow with a change in position or attitude of an aircraft engine equipped with a carburetor embodying such type of regulator, due to the gravity effect on the fuel valve whose position at idling and fuel flows bordering on idling was determined primarily by the idle spring; the main regulator system had to be designed to coact with the idle system, which rendered it difficult to meet exacting specifications of both systems; it was difficult to attain the desired fuel flow curve at the "tie-in" point, or between the high end of idle metering and the low end of power metering.

The present invention has for one of its prime objectives, therefore, to provide a charge-forming device which will effectively overcome the objectionable characteristics above noted, not only in carburetors of the type specified but in any fuel-metering system to which the teachings of the invention may be applicable.

Another object is to provide a charge-forming device or carburetor of the pressure-feed type having an idle system which may be readily adapted to engines having different fuel flow characteristics.

A further object is to generally improve the construction, design and metering characteristics of carburetors, particularly under low air flow conditions.

The foregoing and other objects and advantages will become apparent in view of the following description taken in conjunction with the accompanying drawings, wherein:

Figure 1 is a view in sectional diagram of an injection carburetor embodying the invention;

Figures 2 and 3 are sections taken respectively on the lines 2—2 and 3—3 of Figure 1, particularly showing the arrangement of the throttle-controlled idle valve metering and control orifices;

Figure 5 is a curve chart illustrating the operation of the idle system;

Figure 6 illustrates how the idle metering valve may be contoured to meet special fuel flow characteristics; and Figure 7 illustrates a modification wherein idle metering is influenced by changes in pressure and temperature.

Figure 1:
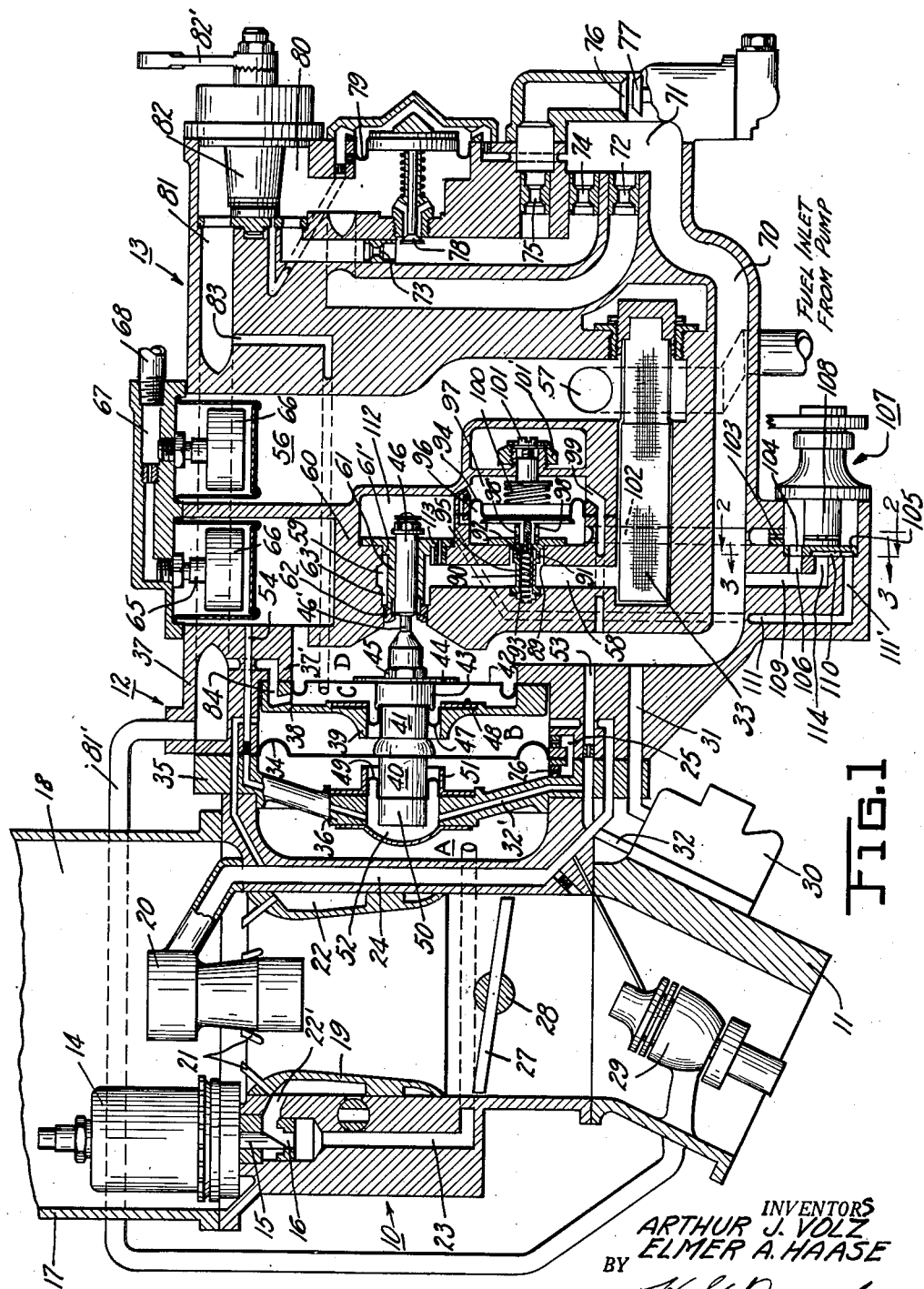

First considering Figure 1, the carburetor therein illustrated consists of an assembly made up generally of the following main parts: a throttle body 10, an adapter 11, a regulator unit 12, a fuel control body 13, and an automatic mixture control unit 14 containing a density responsive capsule or bellows, not shown, which actuates a needle valve 15 to control a valve port 16.

The throttle body is adapted for mounting at the discharge end of an air scoop or induction conduit 17 defining an air intake passage 18 which directs air into the inlet to the carburetor, the latter having mounted in said inlet a main venturi 19 and a boost venturi 20. Adjacent the boost venturi are the impact tubes 21 on which scoop pressure is imposed and is communicated through chamber 22, passage 22', valve port 16 and passage 23 to chamber A of the air section of the regulator.

Venturi suction resulting from the flow of air through the boost venturi 20 is communicated by way of passage 24 to chamber B of the regulator.

At their lower extremities, chambers A and B are connected by a passage 25 having one or more mixture control bleeds 26 therein which become increasingly effective to reduce the differential across the air diaphragm as the pressure in chamber A is reduced due to the action of needle valve 15, as will be more fully hereinafter described.

A throttle valve 27, carried by a rotatable shaft 28, is located in the air induction passage 18 preferably posterior the main venturi 19.

The adapter 11 carries a pressure type discharge nozzle 29 which injects fuel into the air stream posterior the throttle; it may be set to open under a predetermined pressure of say ten to fifteen pounds. The adapter also carries an accelerator pump 30 for giving an initial enrichment to the fuel-air mixture when the throttle is moved towards open position and avoid lag or delay in acceleration; it may be of any preferred construction, the type here shown receiving fuel by way of a passage 31 from the fuel supply or intake conduit, and having vent passages 32, 32' leading to the back of the main poppet or fuel valve so as to give an opening impulse to the latter whenever the pump is actuated.

The regulator 12 houses the fuel valve assembly and coacting parts for actuating the same; it is in the form of a series of castings defining the air pressure chamber A, depression chamber B, metered fuel chamber C and unmetered fuel chamber D; also, a relatively large fuel chamber housing a fuel strainer 33, vapor separator assembly, main fuel valve head assembly, and the idle valve assembly to be described. Chambers A and B are separated by a flexible air diaphragm 34 which is securely anchored at its outer edge between end spider ring 35, (having a hub portion 36) and an annular member or casting 37, the latter having an inner offset or flanged portion 37' to which is secured a cup-shaped member 38 provided with a hub 39; and said diaphragm is engaged centrally on one side by a bushing 40 forming part of the main fuel valve stem assembly, and on the opposite side by a bushing 41 also forming part of said latter assembly. Chambers C and D are separated by a flexible fuel diaphragm 42, which is securely anchored at its outer edge between the outer edge portion of the member 38 and the adjacent inner offset or flanged portion 37' of the member 37, and said latter diaphragm is engaged centrally on one side by a bushing 43 and on the opposite side by a backing plate 44 held in place by a combined end nut and bushing 45 secured on the stem 46' of the main fuel valve 46. Chambers B and C are separated by the member 38 and a sealing diaphragm 47 which is clamped at its outer or peripheral edge between the adjacent surface of the hub 39 and a ring-shaped member 48, and at its central portion between the valve stem bushings 41 and 43. A balancing diaphragm 49 has its central portion clamped between the bushing 40 and an end cap or bushing 50 forming part of the stem assembly of the main fuel valve 46 and at its outer edge is clamped between the adjacent surface of the hub 36 and the flange of a hub ring or bushing 51. The diaphragms 47 and 49 are preferably of such relative effective areas that their effects balance out or cancel one another. A chamber 52 in back of diaphragm 49 is in pressure communication with fuel chamber D of the regulator by way of passage 32' and a passage 53 having a suitable restriction therein; and another passage 54, also having a restriction therein, vents chambers 52 to said fuel chamber. The restrictions in the passages 53 and 54 permit effective operation of the accelerator pump when the latter suddenly applies pressure to chamber 52. The casting 37 defines a main fuel chamber 56 to which fuel is supplied under pump pressure through inlet 57 and thence passes through strainer 33 to intake passage 58 and by way of the latter passage to the main poppet valve chamber 59 defined by a wall 60. A valve bushing 61 has an enlarged disc-like head 61' fixed in the wall 60 and a bearing portion projecting into chamber 59 and terminating short of a valve seat 62 to thereby define a valve port 63 between valve chamber 59 and chamber D of the regulator which is controlled by valve 46.

The chamber 56 is provided with a vapor separating system including valves 65 controlled by floats 66 which operate to open the vent valves when vapor collects sufficiently to lower the fuel level to a given point. The vapor so vented is passed through passage 67 back to the fuel tank, not shown, by way of conduit 68.

The fuel control unit (generally indicated at 13) is connected to the regulator 12 by a fuel passage 70 through which unmetered fuel flows to a chamber 71; and beyond this chamber are the metering jets, four in number in the present instance, viz. auto-lean jet 72, auto-rich jet 73, power enrichment jet 74 and derichment jet 75, the flow of fuel to the latter being by way of port 76 controlled by a derichment valve 77 forming part of a water or anti-detonant metering system, not shown, and constituting no part of the present invention. A power enrichment valve 78 is provided and is operated by a diaphragm 79 subjected to the differential between metered and unmetered fuel, the valve opening when the fuel metering force attains a certain predetermined value. Fuel to valve 78 and auto-rich jet 73 flows through jet 74.

The metering jets are located in flow channels which conduct fuel to a chamber 80 and thence to a fuel discharge passage 81 which has connected to the discharge end thereof a fuel line or pipe 81' leading to the discharge nozzle 29. A manual mixture control valve 82, provided with a handle 82', has a series of coacting ported valve plates, not shown, which may be manually adjusted to different positions to select the mixture to be supplied to the engine.

Metered fuel pressure is communicated to chamber C of the regulator by means of passage 83, and said latter chamber is vented of air or vapor by means of a passage 84.

The foregoing constitutes a general description of the parts which regulate metering at norml fuel flows, or at air flows above a certain predetermined value. The idle system for regulating metering at low air flows will now be described.

The wall of the pasage 58, which conducts fuel at pump pressure to the main poppet valve chamber 59, is formed with an opening 89, and therein is mounted a valve housing or casing 90 formed with one or more idle fuel inlets 91 and a valve port or seat 92 controlled by an idle poppet valve 93, the latter normally being urged toward closed position by a valve spring 95. A diaphragm 94 forms a movable partition between a chamber 96 and chamber 97, movement of the diaphragm to the left, or in a valve-opening direction, being limited by a bushing 98 formed with fuel-outlet openings 98'. A passageway 99 communicates chamber 97 with chamber D of the regulator, and an idle spring 100 abuts the central reinforced portion of the diaphragm 94 and normally urges the idle valve 93 towards open position, said spring being adjustable by means of a screw 101 which may be held fixed in its adjusted position by lock nut 101'. In the example herein disclosed, the idle spring maintains a constant differential across the diaphragm 94, so that it maintains a constant idle metering head across the idle metering restriction 103.

Idling fuel flows from passage 58 through inlets 91 and idle valve port 92 to chamber 96 and from the latter chamber by way of a passage 102 to metering restriction or jet 103 and, assuming the throttle 27 to be in idling position, thence through contoured idle metering orifice 104 formed in a rotatable valve plate 105 constituting part of an idle valve assembly or unit generally indicated at 107 and including a rotatable shaft 108 to which the plate 105 is secured. When the orifice 104 is in part or full registration with port 106, fuel flows by way of passage 109 to the fuel conduit 70. The valve plate 105 is also formed with a radial passage or channel 110 communicating at its outer end with an arcuate slot or flow channel 110'; and when the orifice 104 registers a predetermined amount with orifice 106 (depending upon the desired idling characteristic as wil be more fully hereinafter explained) port 111' is closed by the contiguous surface of plate 105 and fuel under pump pressure is trapped in a chamber 112 in back of the main poppet valve 46, said chamber 112 being in communication with passage 58 through a restricted orifice or bleed 113. At a predetermined throttle position, or at a predetermined degree of registration of idle metering orifice 104 with port 106, the arcuate slot 110' communicates passage 111 with passage 109 through port 111', radial slot 110 and passage 114, and chamber 112 is then vented to conduit 70.

Figure 4:
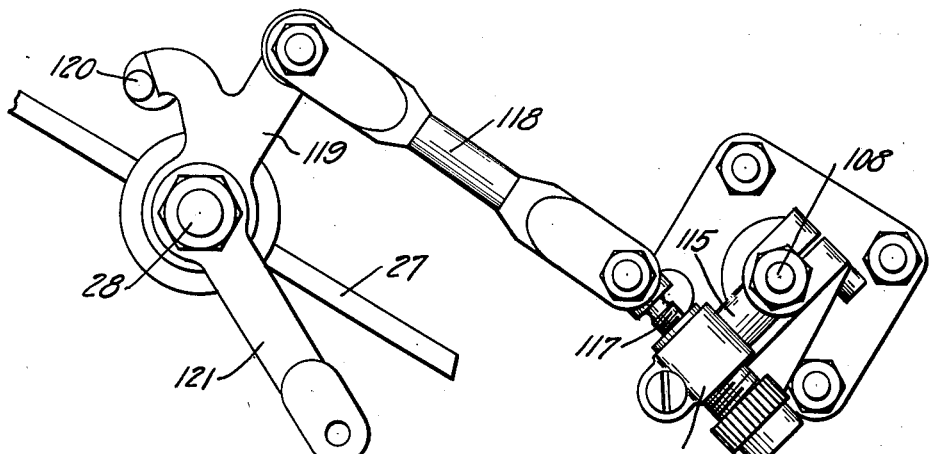
Figure 4 illustrates a type of connecting linkage between the throttle and the idle valve.

The rotatable shaft 108 of the idle valve assembly may be connected to the throttle or to the throttle operating linkage in any appropriate manner, depending upon the particular installation. As illustrated in Figure 4, the projecting end of the shaft 108 has secured thereon an arm 115 having a bracket portion 116 in which is threaded a screw connector 117 pivotally connected to the one end of a link 118, the opposite end of the link being pivotally connected to an arm 119 provided with a stop 120 and secured on the projecting end of throttle shaft 28. An arm 121 is also secured to shaft 28 and is adapted to be connected to any suitable throttle control mechanism, either manual or automatic.

The operation is as follows:

When the engine is running, air is drawn into the air scoop or induction passage 18 and thence through the venturis 20 and 19, and a differential pressure is created between the throat of the venturi 20 and the carburetor air inlet which at constant entering air density is proportional to the square of the quantity of air flowing. The respective pressures which produce this differential are transmitted to chambers A and B and create a net force on diaphragm 34 tending to open the fuel valve 46. This force is termed the "air metering force." If this force were unopposed, the valve 46 would move to its full open position, but when the valve opens, fuel under pressure flows into the unmetered fuel chamber D and thence through conduit 70 to chamber 71 of the fuel control body B, from which it flows through any one or more of the respective metering orifices, depending upon the position of the manual control valve 82, into conduit 81 and fuel line 81' to the discharge nozzle 29. When the fuel pressure attains a value of, for example, ten pounds per square inch, discharge begins. Chamber D is subjected to unmetered fuel pressure and chamber C to metered fuel pressure, and the differential between these respective pressure acts upon the diaphragm 42 tending to move the fuel valve 46 to the left, or in a direction tending to close the valve. This force is termed the "fuel metering force" and it opposes the air metering force. The valve 46 is thus caused to adjust itself to a point of equilibrium such that the differential of pressure across the fuel metering orifice is equal to the differential between the air inlet and venturi, whereby a constant fuel-air proportioning is maintained. As engine speed is decreased, as for example by closing throttle 27, the rate of air flow through the venturi is decreased, thereby decreasing the differential pressure acting on diaphragm 34, causing the valve 46 to move towards closed position and thus decreasing the fuel flow to compensate for the decreased rate of air flow.

Since the venturi-to-air-scoop differential pressure increases for a given rate of mass air flow upon a decrease in entering air density, the differential pressure across the diaphragm 34 will tend to increase, thereby increasing the fuel flow and enriching the mixture. In order to prevent such enrichment with an increase in altitude, the automatic control device and calibrated bleed or bleeds 26 are provided, said bleeds being substantially ineffective to vary the pressure in these chambers at such times when the needle valve 15 is in open position, as at ground level, but becoming increasingly effective in reducing the pressure in chamber A.

As heretofore noted, in the particular form of idle system illustrated in the present instance, the idle spring 100 maintains a substantially constant differential across the diaphragm 94, and hence the idle metering head is maintained at a predetermined constant value, idle flow being determined by the contoured idle valve orifice 104. Assuming the idle range of throttle opening is in the neighborhood of fifteen degrees as illustrated purely by way of example in Figure 5, then starting from a closed throttle position, (the position of the valve plate 105 in Figure 2), as the orifice 104 progressively registers (counter-clockwise) with the port 106, the idle fuel-air ratio will approximate the curve indicated at the left of Figure 5; and up to a certain degree of throttle opening, the vent 111 will remain closed and hence fuel under pump pressure will be trapped in chamber 112 and the main poppet valve 46 will remain closed. As the throttle opens further, the right-hand end of the arcuate channel 110' (Figure 2) begins to register with the port 111', and the chamber 112 is then vented to the conduit 70 through passage 111, port 111', channel 110', radial channel 110, and passages 114 and 109. The main poppet valve is now free to operate; however, the air flow at this time may be relatively low and hence the differential across the main air diaphragm 34 may also be of a relatively low value, under which conditions the main poppet valve 46 will produce a relatively low metering head across the main metering jets. During this phase of the idle range, flow of fuel through port 106 and idle orifice 104 is gradually being reduced as orifice 104 moves out of registration with port 106; but as the throttle opens further, air flow through the intake passage 18 increases, until the carburetor is metering on "auto-lean" or "auto-rich" depending upon the jet selected by the pilot.

As the throttle is closed from its wide open position, (or a predetermined open position above idling) the air flow through the main air intake passage 18 gradually decreases until the differential across the air diaphragm 34 drops to a value such that the main poppet valve 46 substantially closes, or floats in an almost closed position. Closing movement of the throttle produces clockwise rotation of valve plate 105, and when the contoured portion of the orifice 104 begins to reduce the quantity of idling fuel, the main poppet valve is producing a relatively low metering head across the main metering jets. As the idling flow is reduced, the main fuel feed is also reduced; and as the valve plate 105 is rotated further and further in a clockwise direction, the channel 110 moves out of registration with the port 111' and the latter is closed, thereby closing off the vented passage 111 to chamber 112, and fuel under pump pressure is built up in the latter chamber through the bleed or restricted passage 113. The idling fuel is then supplied solely through the idling jet, its rate of flow being determined by the contour of the orifice 104.

Figure 2:
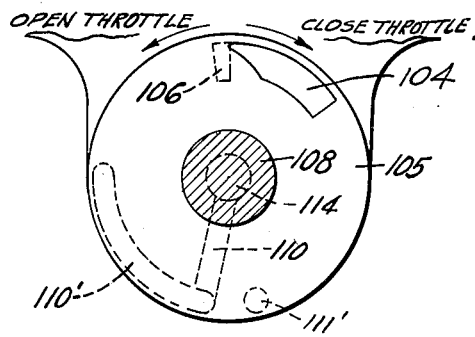
Figure 3:
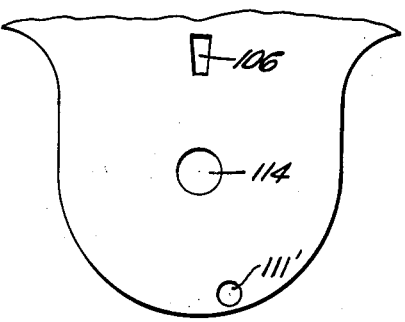

It will be noted that with the contour of the orifice 104 as shown in Figure 2, a substantial part of the idle flow is carried well out into the cruise range (either "auto-lean" or "auto-rich") producing the full line curve at the left of Figure 5. It may be desired in some instances to reduce the idle flow earlier as the throttle opens but still maintain a predetermined flow as the air metering force on the air diaphragm 34 gradually increases to a point such that the main poppet valve 46 is regulating along the cruise range, producing the dotted line curve of Figure 5. Figure 6 illustrates how the metering orifice, here indicated at 104', may be contoured to obtain this result. As the valve plate 105' is rotated in a counterclockwise direction, the orifice 104' gradually enlarges the port 106 until full idle flow is attained and thereafter the port 106 is restricted by the reduced portion 104" of the idle metering orifice. This permits more metering on the main regulator at low air flows with less idle flow, resulting in greater economy in fuel consumption.

Since the idle valve is in parallel with the main fuel valve and may be set or adjusted independently of the latter, there need be no marked leaning-out of the fuel-air ratio where the normal fuel metering range ties in with the idle metering range. The idle system may be made to operate at a relatively high metering head, and it is therefore more consistent and stable. Also, fuel flow does not change appreciably where an engine or an airplane in which the engine may be mounted changes its position, as for example, in going into a dive. Furthermore, since the main regulator and jet system and the idle system are independent of one another, the design of either or both systems may be simplified.

If desired, the idle valve could be arranged to open and close as a function of fuel flow or air flow, or both, and thereby vary the idle metering head across the idle jet 103 in relation to changes in air and/or fuel flow. This could be done, for example, by subjecting the diaphragm 94 to fuel and/or air flow differentials, so that at low air flows or in the idle range of the throttle the idle valve would seek a correspondingly low metering position.

It will be noted that in the main regulator, the air diaphragm 34 is of greater effective area than the fuel diaphragm 42. These diaphragms, however, may be of the same effective area or of any relatively effective areas. By having the air diaphragm of greater effective area than the fuel diaphragm, the system can operate on higher metering heads for a given air flow than where the diaphragms are of the same area, an advantage of which is that any restriction which may occur in the system has less effect on metering.

In certain instances, it may be desired to also regulate the idle metering head as a function of charge pressure and temperature. Figure 7 illustrates means whereby this may be accomplished. In this instance, parts which correspond to the like parts in Figure 1 are given like reference numerals. The additional parts comprise a temperature responsive unit which may include a bellows 125 suitably loaded for temperature response and having a fluid connection with a temperature element, not shown, but which may be mounted at a point where it will produce a response of the bellows 125 to changes in charge temperature, as for example, in the carburetor air inlet or in the intake manifold. The bellows 125 has its movable end abutting a spring 128 adjustably connected to a lever 129 through the medium of a fitting 130. A pressure responsive element in the form of a bellows or capsule 131 has its one end anchored to a wall 132 defining a substantially closed chamber 133, which may be vented to atmosphere or air intake pressure by means of a conduit 134. The movable portion of the bellows 131 is provided with a universally movable stem 135 which is pivotally connected to the lever 129 at 136. The lever 129 is fulcrumed at 137 and its free end is pivotally connected to a stem 138 which carries a cap 138' engaging idle spring 100' backing up the diaphragm 94.

The operation is substantially the same as the idle system heretofore described, except that in this instance the differential across diaphragm 94 is influenced by changes in pressure and temperature, and hence the idle metering head is regulated as a function of pressure and temperature. Instead of having the device responsive to changes in both pressure and temperature, it could be rendered responsive to either one or the other.

It will be understood that the various diaphragms, fuel valves and coacting metering devices are frequently arranged in a manner different from the schematic showing in Figure 1, and that the improved idling system may be readily incorporated in pressure-feed carburetors of a type other than that herein illustrated once a knowledge thereof is obtained from the instant disclosure. The foregoing and other obvious changes in structure and arrangement of parts are contemplated within the scope of the invention as defined by the appended claims.

We claim:

1. In a charge forming device, an air inlet passage, a fuel supply conduit having a metering restriction therein, a main fuel valve for regulating the metering head across said restriction, means for regulating said valve as a function of the flow of air through said passage, said valve at low air flows tending to move to a nearly closed or fully closed position, an idle fuel passage by-passing said main fuel valve and having a metering restriction therein, an idle fuel valve, means for regulating said idle fuel valve to maintain a predetermined metering head across said idle restriction, a contoured idle flow regulating valve posterior said idle restiction movable to open and closed positions, and means rendered operative through movement of said latter valve for automatically subjecting said main fuel valve to closing pressure over a predetermined part of the idle metering range.

2. In a charge forming device for an engine, an air inlet passage, a fuel supply conduit having a metering restriction therein, a main fuel valve for regulating the metering head across said restriction, means for regulating said valve as a function of the flow of air through said passage, said valve at low air flows tending to move to a nearly closed or fully closed position, an idle fuel passage by-passing said main fuel valve and having a metering restriction therein, an idle fuel valve, means for regulating said idle fuel valve to maintain a predetermined metering head across said idle restriction, an adjustable contoured idle flow regulating valve posterior said idle restriction, means providing a pressure chamber in pressure communication with the main fuel valve having a vent passage controlled by adjusting movement of said idle flow regulating valve in a manner such that the vent passage is closed over a predetermined portion of the range of idle flow control to trap pressure in said chamber and hold the main fuel valve closed.

3. In a charge forming device for an engine, a throttle controlled air inlet passage, a fuel supply conduit having a metering restriction therein, a main fuel valve for regulating the metering head across said restriction, means for regulating said valve as a function of the flow of air through said passage, said valve at low air flows tending to seek a closed position, an idle fuel feeding system including an idle fuel passage having a metering restriction therein and an idle valve in parallel with said main fuel valve, means controlling said idle valve including an idle spring arranged to maintain a predetermined substantially constant differential across said restriction, a contoured idle flow regulating valve posterior said restriction, means for exerting a holding pressure on said main fuel valve to hold the latter closed over a predetermined portion of the idle range, and means responsive to throttle position for controlling said holding means and said idle flow regulating valve.

4. In a pressure feed carburetor having a throttle controlled air inlet and a main fuel valve controlled by movable pressure responsive means subjected to a differential pressure varying in relation to changes in air and fuel flows, an idle system including an idle fuel passage by-passing said main fuel valve and having a metering restriction therein, an idle fuel valve, pressure responsive means connected to said latter valve, means for subjecting said last named pressure responsive means to a substantially constant pressure differential to thereby maintain a substantially constant metering head across said idle restriction, means defining a pressure chamber in pressure communication with said main fuel valve and also with a source of fuel under pressure for exerting a holding pressure on the said main fuel valve when the latter is closed, a normally open vent passage for relieving said chamber of pressure to permit normal operation of the main fuel valve, and a throttle controlled contoured idle flow regulating valve posterior said restriction for regulating the flow of idle fuel to the engine and for also controlling said vent passage.

5. In a pressure feed carburetor having a throttle controlled air inlet and a fuel supply conduit controlled by a main fuel valve provided with movable pressure responsive means subjected to a differential pressure varying in relation to changes in air and fuel flows, an idle system including an idle fuel passage by-passing the main fuel valve and having a metering restriction therein, an idle fuel valve, pressure responsive means connected to said latter valve, means including an idle spring for subjecting said last named pressure responsive means to a substantially constant pressure differential to thereby maintain a substantially constant metering head across said idle restriction, means defining a chamber in pressure communication with said main fuel valve to subject the latter to a holding pressure, said chamber being in restricted inflow communication with a source of fuel under pressure, a normally open passage for relieving pressure from said chamber to permit normal operation of the main fuel valve, and a throttle controlled valve posterior said idle metering restriction arranged to regulate idle fuel flow and also control said vent passage.

6. In a pressure feed carburetor, a throttle controlled air inlet, a fuel supply conduit provided with a metering restriction, and a main fuel valve for regulating the metered head across said restriction, movable pressure responsive means connected to said valve and subjected to a differential pressure varying in relation to changes in air and fuel flows, an idle system including an idle fuel passage by-passing the main fuel valve and having a metering restriction therein, said idle fuel passage receiving fuel from said conduit upstream of said main fuel valve and having its outlet arranged to discharge into said conduit downstream of said valve, an idle poppet valve controlling said idle flow passage upstream of said idle metering restriction, means connected to said idle valve for subjecting the latter to a substantially constant pressure differential to thereby maintain a substantially constant head across said idle metering restriction, means defining a pressure chamber in pressure communication with said main fuel valve to subject the latter to a holding pressure, said chamber being in restricted inflow communication with said main fuel supply conduit upstream of said main fuel valve, a vent passage for venting said chamber to said fuel conduit downstream of said main fuel valve, and a throttle controlled contoured idle fuel metering valve downstream of said idle metering restriction, said last named valve being also adapted to control said vent passage.

7. In a pressure feed carburetor having a throttle controlled air inlet and a fuel supply conduit provided with a metering restriction, a main fuel valve for regulating the metering head across said restriction, pressure responsive means connected to said valve and subjected to a differential pressure varying in relation to changes in air and fuel flows, an idle system including an idle fuel passage by-passing the main fuel valve and having a metering restriction therein, an idle fuel valve, pressure responsive means connected to said latter valve and subjected to a substantially constant differential to thereby maintain a substantially constant metering head across said idle metering restriction, and a contoured idle valve movable in relation to throttle position and controlling the flow of idle fuel posterior said idle metering restriction, said last named valve having a contour such that a predetermined increment of idle fuel may be added to the normal supply throughout a predetermined part of the metering range.

8. In a charge forming device for an engine, an air inlet passage, a fuel supply conduit having a metering restriction therein, a main fuel valve for regulating the metering head across said restriction, means for regulating said valve as a function of the flow of air through said passage, said valve tending to seek a closed position at low idling speeds of the engine, an idle fuel feed system including an idle valve in parallel with said main fuel valve arranged to pass fuel to the engin independently of said main fuel valve, a regulating element connected to said idle valve, means for maintaining a predetermined differential across said element, and means responsive to changes in temperature for modifying said differential.

9. In a charge forming device for an engine, an air inlet passage, a fuel supply conduit having a metering restriction therein, a main fuel valve for regulating the metering head across said restriction, means for regulating said valve as a function of the flow of air through said passage, said valve tending to seek a closed position at low idling speeds of the engine, an idle fuel feed system including an idle valve in parallel with said main fuel valve arranged to pass fuel to the engine independently of said main fuel valve, a regulating element connected to said idle valve, means for maintaining a predetermined differential across said element, and means responsive to changes in the pressure of the air flowing to the engine for modifying said differential.

10. In a charge forming device for an engine, an air inlet passage, a fuel supply conduit, a metering restriction in said conduit, a main fuel valve for regulating the metering head across said restriction, means for regulating said valve as a function of the flow of air through said passage, said valve at low air flows tending to move to a closed position, an idle fuel passage by-passing said main fuel valve and having a metering restriction therein, an idle fuel valve for regulating the metering head across said metering restriction, a control element connected to said idle valve, means for subjecting said element to a predetermined differential pressure, and means responsive to changes in pressure and temperature of the air flowing to the engine for modifying said differential.

ARTHUR J. VOLZ.
ELMER A. HAASE.

REFERENCES CITED

The following references are of record in the file of this patent:

UNITED STATES PATENTS

| Number | Name | Date |
|---|---|---|
| 2,361,227 | Mock | Oct. 24, 1944 |
| 2,382,625 | Garretson | Aug. 14, 1945 |
| 2,391,755 | Twyman | Dec. 25, 1945 |
| 2,412,563 | Curk | Dec. 17, 1946 |
| 2,420,029 | Holley | May 6, 1947 |
| 2,448,131 | Williams et al. | Aug. 31, 1948 |